(12) United States Patent
Okita et al.

(10) Patent No.: US 11,844,358 B2
(45) Date of Patent: Dec. 19, 2023

(54) VEGETABLE TREATMENT METHOD

(71) Applicant: ART FOODS CO., LTD., Saitama (JP)

(72) Inventors: Tetsu Okita, Saitama (JP); Ikuya Tajima, Saitama (JP)

(73) Assignee: ART FOODS CO., LTD., Saitama (JP)

( * ) Notice: Subject to any disclaimer, the term of this patent is extended or adjusted under 35 U.S.C. 154(b) by 0 days.

(21) Appl. No.: 18/010,253

(22) PCT Filed: Mar. 31, 2022

(86) PCT No.: PCT/JP2022/016662
§ 371 (c)(1),
(2) Date: Dec. 14, 2022

(87) PCT Pub. No.: WO2022/215654
PCT Pub. Date: Oct. 13, 2022

(65) Prior Publication Data
US 2023/0189829 A1    Jun. 22, 2023

(30) Foreign Application Priority Data

Apr. 7, 2021   (JP) .................................. 2021-065287

(51) Int. Cl.
*A23B 7/157*   (2006.01)
*A23B 7/158*   (2006.01)
*A23B 7/005*   (2006.01)

(52) U.S. Cl.
CPC ............. *A23B 7/158* (2013.01); *A23B 7/005* (2013.01); *A23B 7/157* (2013.01)

(58) Field of Classification Search
CPC ..................................................... A23B 7/158

USPC ......................................................... 426/335
See application file for complete search history.

(56) References Cited

FOREIGN PATENT DOCUMENTS

| JP | 58-67144 A | 4/1983 |
| JP | 2000-342172 A | 12/2000 |
| JP | 2005-185144 A | 7/2005 |
| JP | 2007-252340 A | 10/2007 |
| JP | 2009-17859 A | 1/2009 |

(Continued)

OTHER PUBLICATIONS

International Search Report Issued in International Patent Application No. PCT/JP2022/016662, dated Jun. 21, 2022, along with an English translation thereof.

(Continued)

*Primary Examiner* — Brent T O'Hern
(74) *Attorney, Agent, or Firm* — GREENBLUM & BERNSTEIN, P.L.C.

(57) ABSTRACT

A vegetable treatment method includes a step A of cutting vegetables as a treatment target into eating sizes; a step B of putting the vegetables in a container basket after the step A is performed; a step C of, while keeping the container basket completely submerged in a cleaning tank filled with a cleaning solution, moving the container basket at a moving speed of 0.15 to 0.7 m/min or circulating the cleaning solution in a stream at 3 to 10 L/min for 5 to 10 minutes after the step B is performed; and a step D of, while keeping the container basket completely submerged in a sterilization tank filled with a bactericide solution, moving the container basket at a moving speed of 0.15 to 0.7 m/min or circulating the bactericide solution in a stream at 3 to 10 L/min for 3 to 10 minutes after the step C is performed.

12 Claims, 3 Drawing Sheets

(56) References Cited

FOREIGN PATENT DOCUMENTS

| | | | |
|---|---|---|---|
| JP | 2010-142134 | A | 7/2010 |
| JP | 2014-198039 | A | 10/2014 |
| JP | 5903459 | B2 | 3/2016 |
| JP | 2016-86756 | A | 5/2016 |
| JP | 2016086756 | A * | 5/2016 |
| JP | 2019-170333 | A | 10/2019 |
| JP | 2021-10349 | A | 2/2021 |
| JP | 7017818 | B1 | 2/2022 |

OTHER PUBLICATIONS

Notice of Reasons for Refusal in Patent Application No. JP2021-065287, dated Jun. 29, 2021, along with an English translation thereof.

Office Action that issued in Chinese Patent Application No. 202280003732.9, dated Sep. 4, 2023, along with an English Translation thereof.

* cited by examiner (a)

(b)

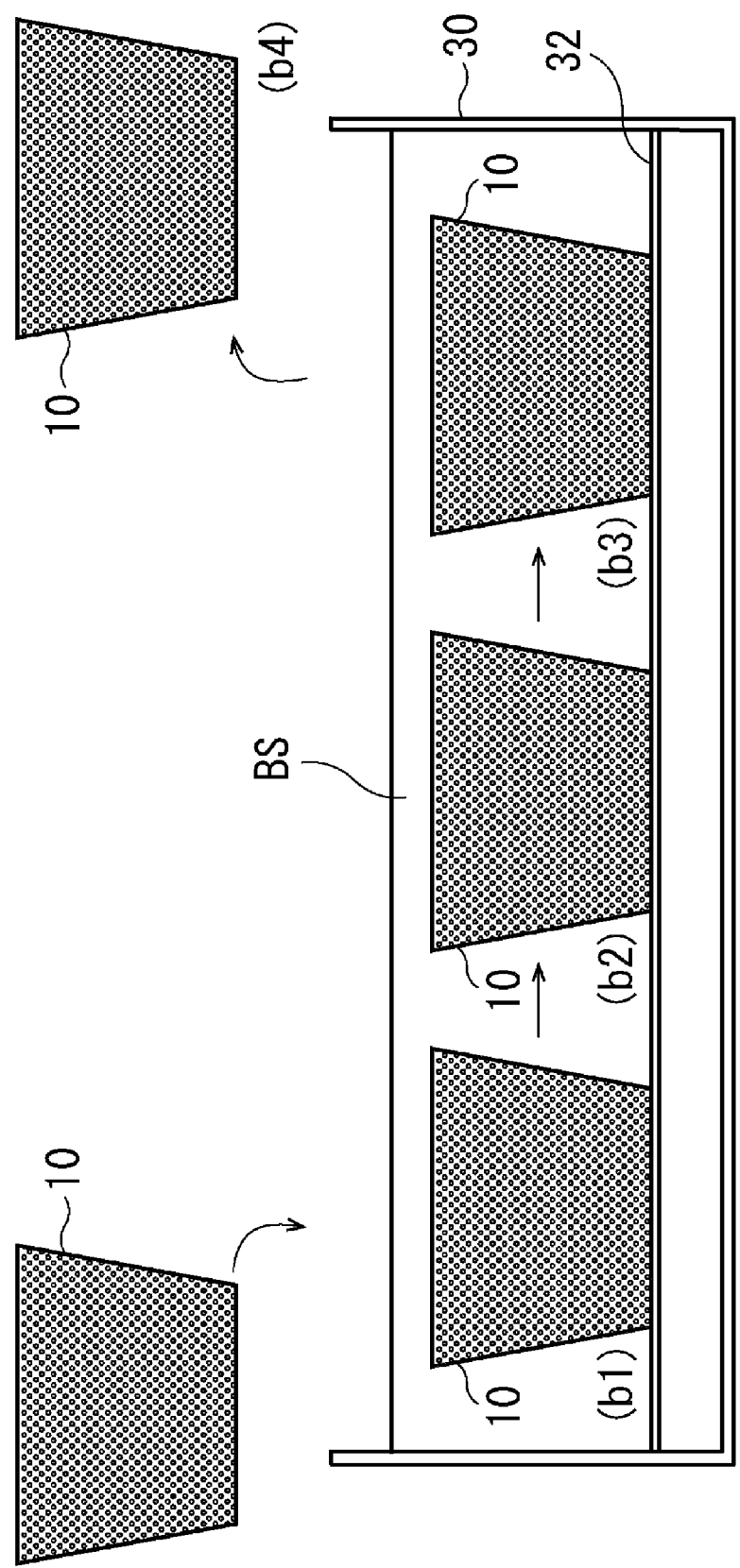

VEGETABLE TREATMENT METHOD

TECHNICAL FIELD

The present invention relates to a vegetable treatment method for treating vegetables, and more particularly to a vegetable treatment method including treatment of cleaning and sterilizing vegetables cut into eating sizes.

BACKGROUND ART

In recent years, there has been a rapid increase in demand for processed products, such as cut vegetables and meal kits, in which raw vegetables are processed in their natural state because such products facilitate cooking at home.

A production process of such processed products (cut vegetables) generally includes trimming, cleaning, cutting, sterilization treatment (treatment with an alkaline food bactericide (for example, sodium hypochlorite or the like), a neutral food bactericide (for example, hypochlorous acid water or the like), or an acidic food bactericide (for example, a peracetic acid preparation or the like)), cleaning (careful cleaning until an odor peculiar to the bactericide is removed), dehydration, weighing, and packing. However, in general, microorganisms remain in fine injuries and the like on the outer faces of processed vegetables, and moreover, some injuries leave areas unreachable by the bactericide solution (in other words, unsterilizable areas). For these reasons, in the current situation, bacteria propagate and exceed a bacteria count within an edible range for a short period of time.

In order to solve this problem, in previous Patent Literature 1, the present inventors proposed a fresh food sterilization method with which almost no residual chlorine odor of an alkaline food bactericide, which is often used from the viewpoints of economy and sterilization effect, remains on fresh food, the number of remaining viable bacteria attached (initial bacterial count) is remarkably low, and the freshness of fresh food can be maintained by suppressing the propagation of various bacteria even in a long-term storage.

In addition, in previous Patent Literature 2, the present inventors also proposed a vegetable treatment method with which the color tone and hardness are maintained at the same levels as at the time of harvesting even when a long time passes after the treatment, eggs of pest insects are effectively removed, and the propagation of various bacteria is also advantageously suppressed.

CITATION LIST

Patent Literature

Patent Literature 1: Japanese Patent Application Publication No. 2021-10349
Patent Literature 2: Japanese Patent No. 5903459

SUMMARY OF INVENTION

Technical Problem

The conventional treatment methods (sterilization methods) including the methods previously proposed by the present inventors are effective to some extent in terms of sterilization (prevention of propagation of various bacteria) and suppression of discoloration, but are incapable of preventing discoloration and fading resulting from injuries, heating, and ultraviolet rays and allow discoloration and fading to occur when a time passes after treatment (for example, 3 to 5 days after the treatment), so that further improvement has been required.

In addition, discoloration and fading resulting from injuries, heating, and ultraviolet rays are noticeable in green vegetables containing chlorophyll, and the commercial values of green vegetables significantly decrease when the green vegetables are discolored or faded. Therefore, there is a demand for suppression of discoloration and fading of green vegetables in particular.

The present invention was made in view of the above circumstances, and has an object to provide a vegetable treatment method capable of preventing discoloration and fading of vegetables over a long period of time by reducing the generation of injuries on the vegetables.

Solution to Problem

In order to achieve the above object, the present inventors have conducted intensive studies and found that a main cause of the discoloration and fading of currently distributed cut vegetables is derived from injuries on the surfaces of the cut vegetables generated by strong streams or the like such as bubbling used in conventional cleaning and sterilization steps. Then, the present inventors have found that when cut vegetables are put in a predetermined container basket and cleaned and sterilized with gentle streams, the surfaces of the vegetables are prevented from being injured and discoloration and fading can be suppressed.

The present inventors have conducted further studies and found that a pH adjustment alone makes it possible to prevent discoloration and fading due to heating and enable long-term storage.

The present invention was made based on these findings.

Specifically, a vegetable treatment method of the present invention includes a step A of cutting vegetables as a treatment target into eating sizes; a step B of putting the vegetables in a container basket after the step A is performed; a step C of, while keeping the container basket completely submerged in a cleaning tank filled with a cleaning solution, moving the container basket at a moving speed of 0.15 to 0.7 m/min or circulating the cleaning solution in a stream at 3 to 10 L/min for 5 to 10 minutes after the step B is performed; and a step D of, while keeping the container basket completely submerged in a sterilization tank filled with a bactericide solution, moving the container basket at a moving speed of 0.15 to 0.7 m/min or circulating the bactericide solution in a stream at 3 to 10 L/min for 3 to 10 minutes after the step C is performed.

According to the vegetable treatment method described above, each piece of the vegetables is cleaned with the movement of the container basket at 0.15 to 0.7 m/min or the stream of the cleaning solution at 3 to 10 L/min and then each piece of the vegetables is sterilized with the movement of the container basket at 0.15 to 0.7 m/min or the stream of the bactericide solution at 3 to 10 L/min. This makes it possible to inhibit the generation of injuries on the outer faces of vegetables while performing sufficient cleaning and sterilization and thereby suppress discoloration and fading of the vegetables.

In addition, the bactericide solution is desirably of any of an alkaline food bactericide, a neutral food bactericide, and an acidic food bactericide.

It is desirable that the vegetables include chlorophyll-containing vegetables, the bactericide solution be a sodium hypochlorite aqueous solution with a concentration of 50 to 300 ppm, and the vegetables be adjusted to a predetermined pH value with the sodium hypochlorite aqueous solution in the step D. In this case, the predetermined pH value is desirably 7.0 to 9.5.

The method may also include a step of taking out the vegetables from the container basket and packing them without cleaning after the step D is performed. In this case, the method may further include a step of performing heat treatment at 50 to 90° C. for 1 to 10 minutes after the step of packing is performed.

It is also desirable that the vegetables include chlorophyll-containing vegetables, the bactericide solution be a sodium hypochlorite aqueous solution with a concentration of 50 to 300 ppm, and the method further include a step E of performing dehydration to remove the sodium hypochlorite aqueous solution after the step D is performed and a step F of adjusting the vegetables to a predetermined pH value by applying a sodium hydrogen carbonate solution with a concentration of 0.2 to 0.5% to the surfaces of the vegetables. In this case, the predetermined pH value is desirably 7.0 to 9.5.

The method may include a step of taking out the vegetables from the container basket and packing them without cleaning after the step F is performed. In this case, the method may further include a step of performing heat treatment at 50 to 90° C. for 1 to 10 minutes after the step of packing is performed.

The container basket desirably includes a bottomed cylindrical metallic main body portion having a large number of through holes and a metallic lid portion having a large number of through holes and being arranged so as to close an opening of the main body portion. In this case, it is desirable that a diameter of each through hole in the main body portion and a diameter of each through hole in the lid portion be smaller than the eating size.

Advantageous Effects of Invention

As described above, according to the vegetable treatment method of the present invention, vegetables are cleaned and sterilized with the gentle streams, so that the generation of injuries on the surfaces of vegetables is inhibited and discoloration and fading are suppressed.

BRIEF DESCRIPTION OF DRAWINGS

FIG. 3 is a diagram for explaining a step D in the vegetable treatment method according to the embodiment of the present invention.

DESCRIPTION OF EMBODIMENTS

Figure 1:
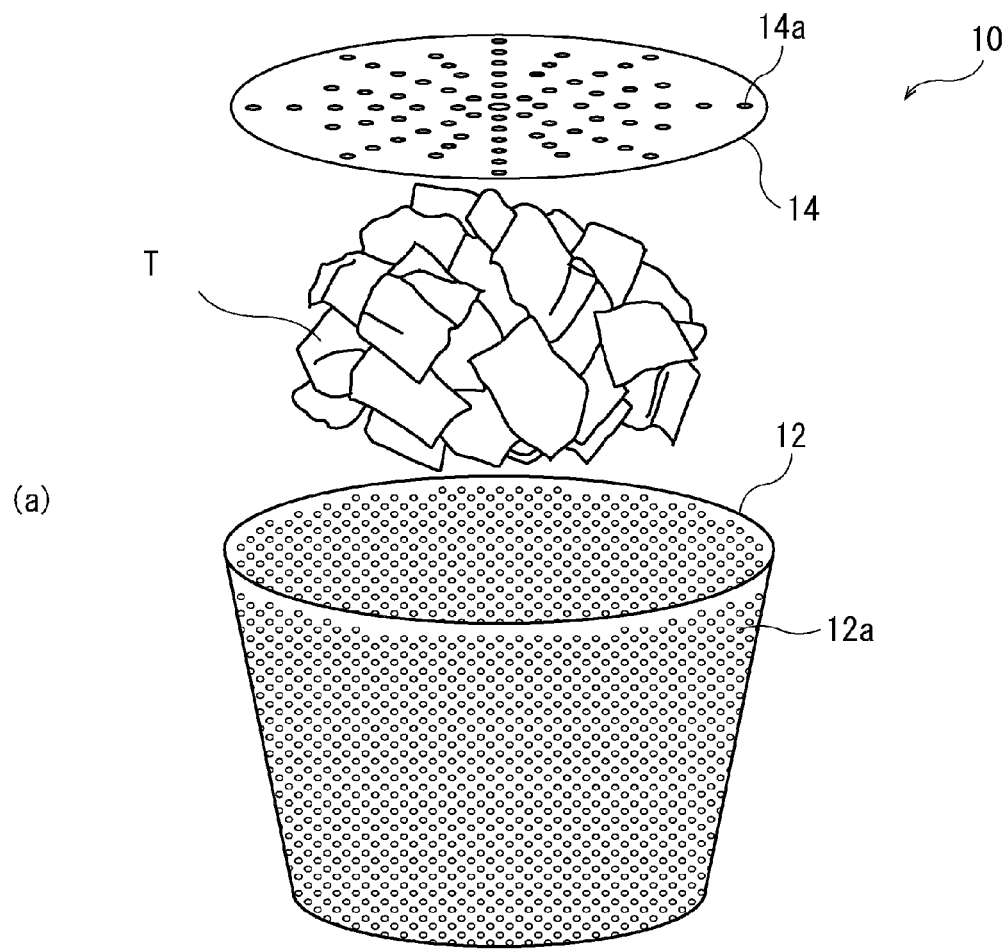
FIG. 1 presents views for explaining a step B in a vegetable treatment method according to an embodiment of the present invention.
Figure 1:
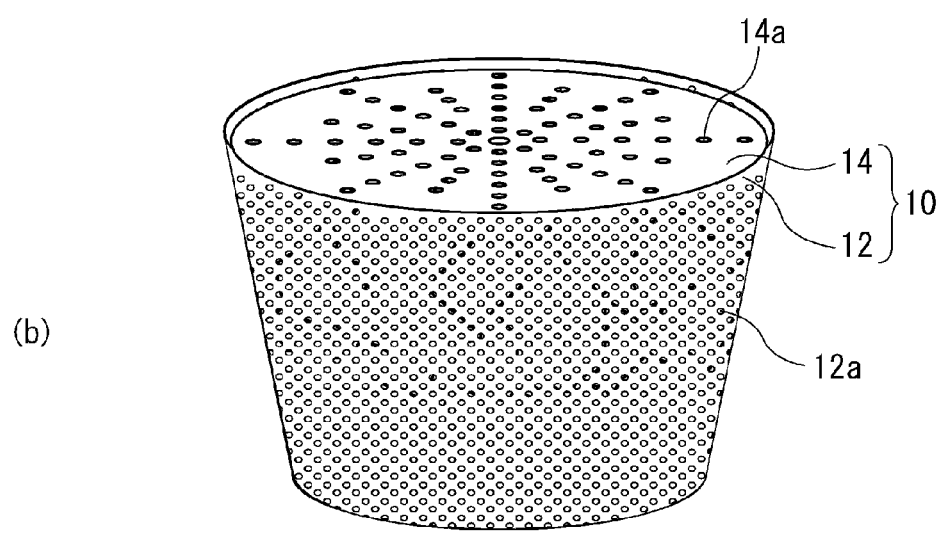

The present inventors have found that the cause of the discoloration and fading of currently distributed cut vegetables is derived from injuries on the surfaces of the cut vegetables generated by the conventional cleaning treatment and sterilization treatment.

In general, the conventional cleaning treatment and sterilization treatment are carried out by putting cut vegetables as a treatment target into a cleaning tank and a sterilization tank and generating strong streams by bubbling or the like. Comparing the surfaces of cut vegetables before the cleaning treatment and the surfaces of the cut vegetables after the sterilization treatment, the present inventors have found that fine injuries are generated on the surfaces of the cut vegetables by the cleaning treatment and the sterilization treatment. These injuries are presumably generated by strong streams due to bubbling or the like, collision with a can wall, or the like.

When the cut vegetables are packed with their surfaces injured, the breathing volume of the vegetables increases. In this connection, it is said that when a whole vegetable is cut in half, the breathing volume increases about twice. When the breathing volume of vegetables in the packed state increases, the amount of oxygen decreases and carbon dioxide gas increases in the pack, impairing the cooling effect of refrigeration and leading to induction of ethylene gas. The ethylene gas thus generated presumably promotes discoloration and fading.

The present invention was made by focusing on such injuries on the surfaces of cut vegetables, and is to treat cut vegetables without injuring their surfaces, thereby suppressing discoloration and fading of the vegetables.

The present inventors have also found that the pH adjustment alone makes it possible to prevent discoloration and fading due to heating and enable long-term storage.

While commonly available anti-discoloration and anti-fading agents for chlorophyll include formulations each composed of an anti-oxidant such as ascorbate and a magnesium-reinforcing material, the present invention is to prevent the discoloration and fading due to heating only with the pH adjustment.

The vegetables targeted in the present invention are not particularly limited, but the present invention is preferably applied to chlorophyll-containing vegetables whose discoloration due to injuries, heating, and ultraviolet rays are noticeable. The chlorophyll-containing vegetables include green vegetables (for example, such as cabbage, Japanese mustard spinach, spinach, asparagus, bell pepper, common bean, crown daisy, bok-choy, gyojana (hybrid of Alpine leek and Chinese chives), broccoli, radish leaves, spring onion, Salsola komarovii, green pepper, Angelica keiskei, watercress, peas, green leaf vegetable, macrophyll, kale, mustard green, Japanese parsley, shepherd's purse, mugwort, Chinese chive, nozawana (Japanese leaf vegetable), garlic sprout, parsley, tree onion, mulukhiya, Japanese honeywort, brussels sprout, and basil).

In the present invention, "cut vegetables" refer to a processed product in which vegetables for use in a salad or meal kit are cut into certain sizes (that is, eating sizes) such as shredded sizes and diced sizes.

(Vegetable Treatment Method)

One mode of the vegetable treatment method of the present invention (hereinafter referred to as "the present embodiment") includes a step A of cutting vegetables into eating sizes, a step B of putting the cut vegetables in a container basket 10, a step C of cleaning the vegetables, a step D of sterilizing the vegetables, and a step E of dehydrating the vegetables, whereby cut vegetables for use in a salad or the like can be obtained.

(Step A)

The step A is a step of cutting vegetables (for example, cabbage) as a treatment target into eating sizes. In the step A, vegetables after the outer leaves, skins, and cores of the vegetables are removed in advance are cut into cubes, juliennes, strips, quarter slices, bar rectangles, round slices, or the like with a knife or cut by shredding with hands. As for the eating size, the vegetables are preferably cut into juliennes with a width of about 1.0 to 5.0 mm or cut into cubes with a side length of 1 to 4 cm from the viewpoint of ease of cooking and eating.

(Step B)

The step B is a step of putting the cut vegetables T into a container basket 10 after the step A is performed. FIG. 1 presents views for explaining the step B; FIG. 1A is a perspective view illustrating how the cut vegetables T are put into the container basket 10, and FIG. 1B is a perspective view illustrating the container basket 10 after the step B is performed (in other words, a state where the cut vegetables T are put in the container basket 10).

As illustrated in FIG. 1, the container basket 10 used in the step B includes a bottomed cylindrical (bucket-shaped) main body portion 12 being made of metal (for example, stainless steel) and having a large number of through holes 12a and a disk-shaped lid portion 14 being made of metal (for example, stainless steel), having a large number of through holes 14a, and being arranged so as to close an opening of the main body portion 12.

In the step B, 3 to 5 kg of the cut vegetables T are put into the main body portion 12 of the container basket 10 and the lid portion 14 is placed on the opening of the main body portion 12 and fixed.

The diameter of each through hole 12a in the main body portion 12 and the diameter of each through hole 14a in the lid portion 14 are set smaller than the size (eating size) of the vegetables T so that the vegetables T may not leak out.

(Step C)

Figure 2:
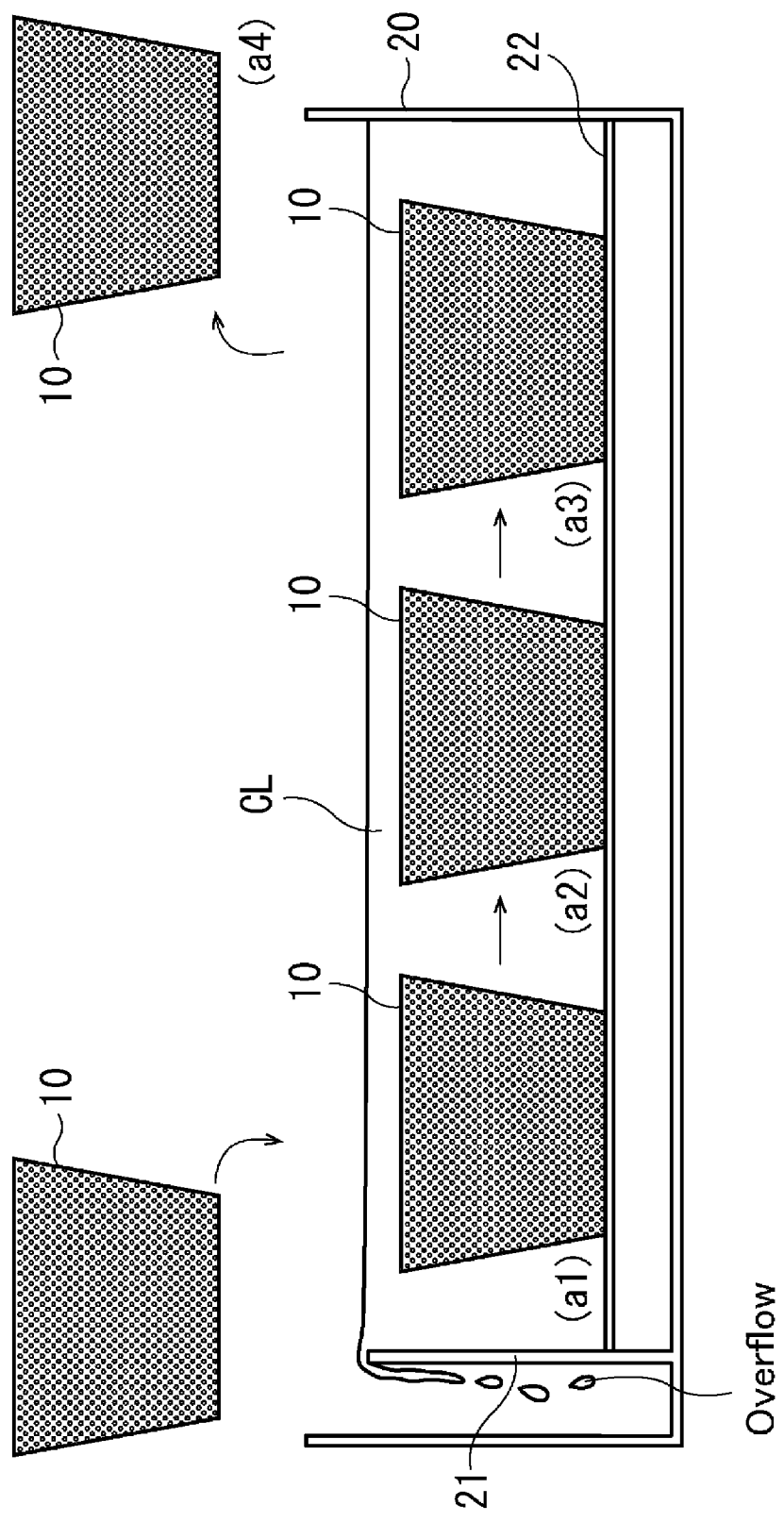
FIG. 2 is a diagram for explaining a step C in the vegetable treatment method according to the embodiment of the present invention.

The step C is a step of cleaning the vegetable T while the container basket 10 is kept completely submerged in a cleaning tank 20 filled with a cleaning solution CL (for example, water, a cleaning solution described in Patent Literature 2, or the like) after the step B is performed. FIG. 2 is a schematic diagram for explaining the step C.

As illustrated in FIG. 2, in the step C, the container basket 10 in which the cut vegetables T are put is completely submerged in the cleaning tank 20 filled with the cleaning solution CL (a1). When the container basket 10 is completely submerged in the cleaning tank 20, the cleaning solution CL enters the inside of the container basket 10 through the through holes 12a in the main body portion 12 and the through holes 14a in the lid portion 14 and the container basket 10 sinks while being filled with the cleaning solution CL. When the container basket 10 sinks, the container basket 10 is placed on a rail 22 installed at a predetermined distance (for example, 10 cm) above the bottom surface of the cleaning tank 20 (a1).

Next, in the step C, the container basket 10 is moved along the rail 22 at a moving speed of 0.15 to 0.7 m/min, so that the container basket 10 is moved from a position a1 to a position a2 and then to a position a3 over a period of 5 to 10 minutes, and then the container basket 10 is taken out from the cleaning tank 20 (a4).

In the step C, the container basket 10 is slowly moved relative to the cleaning solution CL as described above, so that the cleaning solution CL flows over the surfaces of the vegetables T and thereby cleans each piece of the vegetables T evenly and uniformly. The cleaning tank 20 used in the step C is always supplied with a constant amount of the cleaning solution CL from a cleaning solution supply device (not illustrated), and the cleaning solution CL spills out (in other words, overflows) from an upper end of an inner wall 21 of the cleaning tank 20 formed slightly lower than an outer wall thereof.

Therefore, relatively light foreign substances attached to the vegetables T (for example, insects and the like) are taken out into the cleaning solution CL through the through holes 12a in the main body portion 12 and the through holes 14a in the lid portion 14 of the container basket 10, float up, and are discharged to the outside with the overflow of the cleaning solution CL. Meanwhile, relatively heavy foreign substances attached to the vegetables T (for example, sands and the like) are taken out into the cleaning solution CL through the through holes 12a in the main body portion 12 and the through holes 14a in the lid portion 14 of the container basket 10 and are deposited on the bottom surface of the cleaning tank 20. In sum, the step C efficiently removes the foreign substances while cleaning the vegetables T.

In the step C, the vegetables T are cleaned by slowly moving the container basket 10 relative to the cleaning solution CL as described above (in other words, the bubbling or the like in the conventional method is not performed), so that the surfaces of the vegetables T are not injured. Here, instead of the structure of moving the container basket 10, the cleaning solution CL may be circulated in a slow stream at 3 to 10 L/min while the container basket 10 is kept completely submerged in the cleaning tank 20. In other words, "the moving speed of the container basket 10: 0.15 to 0.7 m/min" and "the stream (circulation speed): 3 to 10 L/min" are in an equivalent relationship. When the moving speed of the container basket 10 is set faster than 0.7 m/min or the stream of the cleaning solution CL is set faster than 10 L/min, the surfaces of the vegetables T inside the container basket 10 are likely to be injured with collision with the inner surface of the container basket 10. Meanwhile, when the moving speed of the container basket 10 is set slower than 0.15 m/min or the stream of the cleaning solution CL is set slower than 3 L/min, the cleaning of the vegetables T is likely to be insufficient. When the cleaning time is shorter than 5 minutes, the cleaning of the vegetables T is likely to be insufficient. Meanwhile, when the cleaning time is longer than 10 minutes, the cleaning step acts as a bottle neck to decrease the production capacity.

(Step D)

The step D is a step of sterilizing the vegetables T by completely submerging the container basket 10 in a sterilization tank 30 filled with a bactericidal solution BS (a sodium hypochlorite aqueous solution with a concentration of 50 to 300 ppm in the present embodiment) after the step C is performed. FIG. 3 is a schematic diagram for explaining the step D.

As illustrated in FIG. 3, in the step D, the container basket 10 in which the cut vegetables T are put is completely submerged in the sterilization tank 30 filled with the bactericidal solution BS (b1). When the container basket 10 is completely submerged in the sterilization tank 30, the bactericidal solution BS enters the inside of the container basket 10 through the through holes 12a in the main body portion 12 and the through holes 14a in the lid portion 14 and the container basket 10 sinks while being filled with the bactericidal solution BS. When the container basket 10 sinks, the container basket 10 is placed on a rail 32 installed at a predetermined distance (for example, 10 cm) above the bottom surface of the sterilization tank 30 (b1).

Next, in the step D, the container basket 10 is moved along the rail 22 at a moving speed of 0.15 to 0.7 m/min, so that the container basket 10 is moved from a position b1 to a position b2 and then to a position b3 over a period of 3 to 10 minutes, and then the container basket 10 is taken out from the sterilization tank 30 (b4).

In the step D, the container basket 10 is slowly moved relative to the bactericidal solution BS as described above, so that the bactericidal solution BS flows over the surfaces of the vegetables T and thereby sterilizes each piece of the vegetables T evenly and uniformly. In this way (that is, the bubbling or the like in the conventional method is not performed), the surfaces of the vegetables T are not injured. Here, instead of the structure of moving the container basket 10, the bactericidal solution BS may be circulated in a slow stream at 3 to 10 L/min while the container basket 10 is kept completely submerged in the sterilization tank 30. In other words, "the moving speed of the container basket 10: 0.15 to 0.7 m/min" and "the stream (circulation speed): 3 to 10 L/min" are in an equivalent relationship. When the moving speed of the container basket 10 is set faster than 0.7 m/min or the stream of the bactericidal solution BS is set faster than 10 L/min, the surfaces of the vegetables T inside the container basket 10 are likely to be injured with collision with the inner surface of the container basket 10. Meanwhile, when the moving speed of the container basket 10 is set slower than 0.15 m/min or the stream of the bactericidal solution BS is set slower than 3 L/min, the sterilization of the vegetables T is likely to be insufficient. When the sterilization time is shorter than 3 minutes, the sterilization of the vegetables T is likely to be insufficient. Meanwhile, when the sterilization time is longer than 10 minutes, the sterilization step acts as a bottle neck to decrease the production capacity. In the case where the sodium hypochlorite aqueous solution is used as the bactericidal solution B S, the concentration set higher than 300 ppm is economically disadvantageous or the concentration set lower than 50 ppm is likely to lead to insufficient sterilization of the vegetables T.

(Step E)

The step E is a step of revolving the container basket 10 to perform centrifugal dehydration to remove the bactericidal solution BS after the step D is performed. After the step E is performed, the vegetables T are taken out from the container basket 10 and packed, so that a processed product is completed.

In this way, in the vegetable treatment method of the present embodiment, the vegetables T are treated while being contained in the container basket 10 in the course of the steps B to E. Therefore, continuous production (integrated production) is possible in the course of the steps B to E, and multi-product simultaneous production is also possible.

Since the container basket 10 includes the lid portion 14 and the vegetables T are always covered with the container basket 10, the vegetables T can be uniformly cleaned and sterilized without leaking out of the container basket 10 and floating up in the steps C and D.

In the vegetable treatment method of the present embodiment, the vegetables T are cleaned by slowly moving the container basket 10 relative to the cleaning solution CL in the step C. Therefore, compared to the conventional cleaning step in which the cleaning solution is agitated and bubbled with supply of a large amount of the cleaning solution, the amount of the cleaning solution CL used can be greatly reduced and a bubbling device is not required, resulting in a significant reduction of the production cost.

In addition, since the generation of injuries on the surfaces of the vegetables T is inhibited, the propagation of bacteria is little.

(Effect Confirmation Experiment)

Tables 1 and 2 are tables presenting the results of an experiment conducted by the present inventors to confirm the effect on viable bacteria counts on vegetables. Table 1 is a table for comparison between the viable bacteria counts of vegetables (lettuce and cabbage) treated with the conventional treatment method (cleaning, trimming, cutting, sterilization treatment (sterilization with sodium hypochlorite), cleaning (careful cleaning until an odor peculiar to the bactericide is removed), and dehydration) and the viable bacteria counts of vegetables (lettuce and cabbage) treated with the vegetable treatment method of the present embodiment. In the present experiment, samples of vegetables (lettuce and cabbage) treated with the conventional treatment method (trimming, cutting, sterilization treatment (sterilization with sodium hypochlorite), cleaning (careful cleaning until the odor peculiar to the bactericide is removed), and dehydration) and samples of vegetables T (lettuce and cabbage) treated with the vegetable treatment method of the present embodiment were prepared and were stored under refrigeration, and the viable bacteria counts were investigated after passage of each of predetermined numbers of days ("D+4", "D+8", and "D+11"). Here, in Table 1, "D+4" indicates the number of the viable bacteria count "4 days after a processing day", "D+8" indicates the number of the viable bacteria count "8 days after the processing day", and "D+11" indicates the number of the viable bacteria count "11 days after the processing day".

Table 2 is a table presenting experiment results of treatment in a treatment method in Comparative Example (to be described later) of the present invention.

TABLE 1

| | | | Storage Temperature: 5 to 10° C. | | |
| --- | --- | --- | --- | --- | --- |
| | | | D + 4 | D + 8 | D + 11 |
| Conventional Treatment Method | Lettuce | Viable bacteria (common) count | $4.0 \times 10^5$ | $1.1 \times 10^6$ | $7.9 \times 10^6$ |
| | | Coliform bacteria | $5.1 \times 10^3$ | $1.2 \times 10^5$ | $7.9 \times 10^5$ |
| | Cabbage | Viable bacteria (common) count | $1.9 \times 10^3$ | $1.3 \times 10^5$ | $4.9 \times 10^5$ |
| | | Coliform bacteria | $2.4 \times 10^2$ | $4.7 \times 10^4$ | $1.2 \times 10^5$ |
| Treatment Method of Invention | Lettuce | Viable bacteria (common) count | $4.5 \times 10^4$ | $5.7 \times 10^4$ | $1.4 \times 10^5$ |
| | | Coliform bacteria | Not detected | Not detected | Not detected |
| | Cabbage | Viable bacteria (common) count | $7.0 \times 10^3$ | $6.1 \times 10^3$ | $4.3 \times 10^4$ |
| | | Coliform bacteria | Not detected | Not detected | $4.4 \times 10^2$ |

TABLE 2

|  |  |  | Storage Temperature: 5 to 10° C. | |
|---|---|---|---|---|
|  |  |  | D + 4 | D + 8    D + 11 |
| Treatment Method of Comparative Example | Lettuce | Viable bacteria (common) count | 5.2 × 10⁴ | The experiment was stopped since vegetable waste adhesion and partial discoloration were observed. |
|  |  | Coliform bacteria | Not detected |  |
|  | Cabbage | Viable bacteria (common) count | 6.0 × 10³ |  |
|  |  | Coliform bacteria | Not detected |  |

(Conventional Treatment Method)

As the conventional treatment method presented in Table 1, treatment was given according to the following procedure.
(1) 3 kg of vegetables (lettuce and cabbage) cut into eating sizes (2×4 cm) are put in a cleaning tank (10 L) containing 8 L of a cleaning solution (water), and are cleaned by a bubbling stream at a circulation speed of 12 to 15 L/min for 7 minutes.
(2) The vegetables (lettuce and cabbage) are transferred to a sterilization tank (10 L) containing 8 L of a bactericidal solution (a sodium hypochlorite aqueous solution with a concentration of 200 ppm) and are sterilized by a bubbling stream at a circulation speed of 12 to 15 L/min for 7 minutes.
(3) The vegetables (lettuce and cabbage) are transferred to a cleaning tank (10 L) containing 8 L of a cleaning solution (water), and are cleaned by a bubbling stream at a circulation speed of 12 to 15 L/min until the odor of the sodium hypochlorite is removed (for about 7 to 10 minutes).
(4) The vegetables (lettuce and cabbage) are taken out from the cleaning tank, dehydrated, and then packed.

Regarding the circulation speed, the circulation speed was adjusted with a valve on a square tank suction (intake) side in a centrifugal pump. However, since an error due to an influence of the bubbling was large, the circulation speed was obtained by monitoring the moving speed of the test pieces (vegetable pieces).

(Vegetable Treatment Method of Invention)

As "the vegetable treatment method of the invention" presented in Table 1, treatment was given according to the following procedure.
(1) 3 kg of vegetables T (lettuce and cabbage) cut into eating sizes (2×4 cm) are put in the container basket 10 (step B), and the container basket 10 is completely submerged in the cleaning tank 20 containing 8 L of a cleaning solution (water), followed by cleaning with a stream at a circulation speed of 8 to 10 L/min for 7 minutes (step C).
(2) The container basket 10 is transferred to the sterilization tank 30 (10 L) containing 8 L of the bactericidal solution BS (a sodium hypochlorite aqueous solution with a concentration of 200 ppm), followed by sterilization with a stream at a circulation speed of 8 to 10 L/min for 7 minutes (step D).
(3) The container basket 10 is revolved for centrifugal dehydration to remove the bactericidal solution BS (step E), and the vegetables T are taken out from the container basket 10 and packed (step F).

Regarding the circulation speed, the circulation speed was adjusted with the valve on the square tank suction (intake) side in the centrifugal pump. However, since an error was large, the circulation speed was obtained by monitoring the moving speed of the test pieces (vegetable pieces).

(Treatment Method in Comparative Example)

As "the treatment method in Comparative Example" presented in Table 2, treatment was given according to the following procedure.
(1) 3 kg of vegetables (lettuce and cabbage) cut into eating sizes (2×4 cm) are put in a container basket, and the container basket 10 is completely submerged in a cleaning tank containing 8 L of a cleaning solution (water), followed by cleaning with a stream at a circulation speed of 0 to 2.0 L/min for 7 minutes.
(2) The container basket is transferred to a sterilization tank (10 L) containing 8 L of a bactericidal solution (a sodium hypochlorite aqueous solution with a concentration of 200 ppm), followed by sterilization with a stream at a circulation speed of 0 to 2.0 L/min for 7 minutes.
(3) The container basket is revolved for centrifugal dehydration to remove the bactericidal solution and the vegetables are taken out from the container basket and packed.

Regarding the circulation speed, the circulation speed was adjusted with the valve on the square tank suction (intake) side in the centrifugal pump. However, since an error was large, the circulation speed was obtained by monitoring the moving speed of the test pieces (vegetable pieces).

(Consideration of Experiment)

It is seen that, as presented in Table 1, the viable bacteria count and coliform bacteria on the vegetables T (lettuce and cabbage) treated with the vegetable treatment method of the present embodiment (that is, cleaned and sterilized with the streams at the circulation speed of 8 to 10 L/min) were remarkably fewer than the viable bacteria count and coliform bacteria on the vegetables (lettuce and cabbage) treated with the conventional treatment method (that is, cleaned and sterilized with the bubbling streams at the circulation speed of 12 to 15 L/min) and were kept few even when the time passed after the treatment.

Also, it is seen that, as presented in Table 2, when the streams (circulation speed) of the cleaning solution and the bactericidal solution were set as low as 0 to 2.0 L/min, the streams were too week to clean and sterilize each piece of the vegetables, so that the vegetable waste remained and discoloration progressed.

From the experiment results in Tables 1 and 2, it is seen that the streams (circulation speeds) of the cleaning solution and the bactericidal solution have a close relationship with the viable bacteria count, and cleaning and sterilization with streams at a circulation speed of 3 to 10 L/min make it possible to inhibit the generation of injuries on the outer faces of the vegetables while performing sufficient cleaning and sterilization and keep the viable bacteria count extremely small even when the time passes after the treatment (even "11 days after the processing day").

This is presumably because the vegetables T treated with the vegetable treatment method of the present embodiment have fewer fine injuries on the surfaces than the vegetables treated with the conventional treatment method and therefore are cleaned and sterilized uniformly, and in addition the number of viable bacteria remaining in the injuries is small.

Thus, according to the vegetable treatment method of the present embodiment, the generation of injuries on the surfaces of vegetables is inhibited and the viable bacteria count is kept extremely small even when the time passes after the treatment.

Accordingly, as a result, the discoloration and fading of the vegetables are suppressed.

Here, it is generally known that the discoloration of green vegetables during heating is caused by the decomposition of chlorophyll by heat, oxidation, and ultraviolet rays, and results from a change of the chlorophyll to pheophytin due to decomposition of magnesium that forms the chlorophyll. It is also reported that the rate of change to pheophytin varies depending on pH (for example, see Yuko Yoshida and one other, "Effects of heating and pH on color tone of chlorophyll", Bulletin of Obihiro Otani Junior College, 1992, Vol. 29, pp. 7-10).

Therefore, the present inventors have investigated a method for suppressing the discoloration of vegetables T focusing on the pH value, and found that when the pH value of the vegetables T treated with the vegetable treatment method of the present embodiment is controlled to 7.0 to 9.5, discoloration and fading due to heating and ultraviolet rays can be also suppressed.

(Examination of pH Value)

Table 3 is a table presenting results of a pH value examination conducted by the present inventors in which samples A, B, and C were evaluated as to whether or not the vegetables T were discolored or faded in each of an environment "with ultraviolet rays" and an environment "without ultraviolet rays".

TABLE 3

| | | Storage Temperature: 5 to 10° C. Color tone change (Visual evaluation) | | | |
|---|---|---|---|---|---|
| | | With UV | | Without UV | |
| Sample | pH | D + 5 | D + 10 | D + 5 | D + 10 |
| Sample A | Not adjusted | Δ | X | ○ | Δ |
| Sample B (NaClO water) | 9.4 | ⊚ | Δ | ○ | ○ |
| Sample C (NaClO₃ water) | 8.4 | ⊚ | ○ | ⊚ | ⊚ |

The sample A is a result obtained by treating 30 g of bell pepper and 30 g of cabbage as the vegetables T in the aforementioned steps A to E. After the step E was performed, the vegetables T were taken out from the container basket 10, vacuum-packed, heated in a hot water bath at 65 to 70° C. for 3 minutes, and then stored in a refrigerator (5 to 10° C.).

The sample B is a result obtained by treating 30 g of bell pepper and 30 g of cabbage as the vegetables T in the aforementioned steps A to D (that is, the step E was omitted). After the step D was performed, the vegetables T were taken out from the container basket 10, vacuum-packed, heated in a hot water bath at 65 to 70° C. for 3 minutes, and then stored in the refrigerator (5 to 10° C.).

The sample C is one obtained by treating 30 g of bell pepper and 30 g of cabbage as the vegetables T in the aforementioned steps A to E, and after the step D was performed, taking out the vegetables T from the container basket 10, making a pH adjustment by spraying a sodium hydrogen carbonate solution with a concentration of 0.3% onto the surfaces of the vegetables T, followed by vacuum-packing, heating in a hot water bath at 65 to 70° C. for 3 minutes, and then storage in the refrigerator (5 to 10° C.).

In Table 3, "D+5" indicates a result of visual evaluation of a degree of color tone change (discoloration and fading) "5 days after a processing day" and "D+10" indicates a result of visual evaluation of a degree of color tone change (discoloration and fading) "10 days after the processing day". In Table 3, "x" means that "discoloration and fading were apparently observed", "Δ" means that "discoloration and fading were observed", "○" means that "slight discoloration and fading were observed within a tolerable range", and "⊚" means that "almost no discoloration or fading was observed".

As presented in Table 3, with the treatment in the steps A to E of the present embodiment (that is, in the case of the sample A), in the environment without ultraviolet rays, the discoloration of the vegetables T was suppressed up to "5 days after the processing day" but the discoloration and fading were observed "10 days after the processing day". Meanwhile, in the environment with ultraviolet rays, the discoloration and fading of the vegetables T were observed "5 days after the processing day".

On the other hand, in the sample B, as a result of omission of the step E, the pH was equal to 9.4 because the sodium hypochlorite aqueous solution in the step D adhered to the surfaces of the vegetables T. In this case, the discoloration and fading of the vegetables T were within the tolerable range even "10 days after the processing day" in the environment without ultraviolet rays, and almost no discoloration and fading of the vegetables T were observed up to "5 days after the processing day" even in the environment with ultraviolet rays.

In the sample C, the pH was equal to 8.4 as a result of spraying the sodium hydrogen carbonate solution with the concentration of 0.3% to the surfaces of the vegetables T. In this case, almost no discoloration and fading of the vegetables T were observed even "10 days after the processing day" in the environment without ultraviolet rays, and the discoloration and fading of the vegetables T were within the tolerable range up to "10 days after the processing day" even in the environment with ultraviolet rays.

Thus, it is seen that, when the pH value of the vegetables T treated with the vegetable treatment method of the present invention is controlled to 7.0 to 9.5, the discoloration and fading of the vegetables T after heating may be suppressed even in the environment with ultraviolet rays up to at least "5 days after the processing day" or may be suppressed up to "10 days after the processing day" depending on the condition.

For this reason, in the present embodiment, after the step E is performed, a step F of making a pH adjustment is added to suppress the discoloration and fading of the vegetables T due to heating and ultraviolet rays.

In other words, in order to suppress the discoloration and fading of green vegetables during heating, a formulation composed of an antioxidant such as ascorbate and a magnesium-reinforcing material is generally used. Instead, in the present embodiment, a countermeasure for the same purpose is taken only by adding a pH adjuster solution to the vegetables T.

(Step F)

More specifically, the step F corresponds to the above sample C, and is a step of adjusting the vegetables T to pH=8.4 by applying (for example, spraying) a sodium hydrogen carbonate solution with a concentration of 0.2 to 0.5% to the surfaces of the vegetables T after the step E is performed. In another mode (embodiment), as described above as the sample B, since the sodium hypochlorite aqueous solution with pH=9.4 is used in the step D, the dehydration treatment in the step E may be omitted and the pH adjustment may be made with the sodium hypochlorite aqueous solution in the step D. In this case, after the step D is performed, the vegetables T are taken out from the container basket 10 and packed, so that a processed product is completed.

Although the above description is for explaining the embodiments of the present invention, the present invention is not limited to the configurations of the aforementioned embodiments, but may be modified in various ways within the scope of the technical idea.

For example, the vegetable treatment method uses the sodium hypochlorite aqueous solution (that is, an alkaline food bactericide) with 50 to 300 ppm as the bactericidal solution BS in the present embodiment, but is not limited to this mode. As the bactericidal solution BS, a neutral food bactericide (for example, hypochlorous acid water or the like) or an acidic food bactericide (for example, a peracetic acid preparation or the like) may be used depending on a kind of vegetables.

Moreover, the method including the steps A to F is described as the vegetable treatment method of the present embodiment, but the vegetable treatment method is not limited to this. For example, after the step F is performed, a step G of performing heat treatment may be added, so that a processed product for a meal kit can be produced.

(Step G)

More specifically, the step G is a step of performing heat treatment at 50 to 90° C. for 1 to 10 minutes after the step F is performed. When the step G is added after the step F is performed, a processed product for a meal kit can be produced.

As one of most important factors in recent product development for meal kits, ease of heat cooking is essential. For example, in a case where three items, namely, heated cut vegetables, cooked meat, and seasoning sauce are provided as one set for a Chinese dish such as twice-cooked pork, the dish can be cooked easily at home for a cooking time of about 2 to 3 minutes, so that the heat energy and effort can be saved.

Since processed products for meal kits can be obtained based on the vegetable treatment method of the present invention including the aforementioned steps A to E with addition of the steps F and G as described above, the present invention leads to further benefits for consumers.

It should be noted that the embodiments disclosed this time should be considered to be exemplary and nonrestrictive in all respects. The scope of the present invention is specified not by the above description but by the scope of claims, and is intended to include all modifications within the meaning and scope equivalent to the scope of claims.

REFERENCE SIGNS LIST

10: container basket
12: main body portion
12a: through hole
14: lid portion
14a: through hole
20: cleaning tank
22: rail
30: sterilization tank
32: rail

The invention claimed is:

1. A vegetable treatment method comprising:
   a step A of cutting vegetables to form cut vegetables;
   a step B of putting the cut vegetables in a container basket after the step A is performed;
   a step C of, while keeping the container basket completely submerged in a cleaning tank filled with a cleaning solution, moving the container basket at a moving speed of 0.15 to 0.7 m/min or circulating the cleaning solution in a stream at 3 to 10 L/min for 5 to 10 minutes after the step B is performed; and
   a step D of, while keeping the container basket completely submerged in a sterilization tank filled with a bactericidal solution, moving the container basket at a moving speed of 0.15 to 0.7 m/min or circulating the bactericidal solution in a stream at 3 to 10 L/min for 3 to 10 minutes after the step C is performed.

2. The vegetable treatment method according to claim 1, wherein
   the bactericidal solution is of any of an alkaline food bactericide, a neutral food bactericide, and an acidic food bactericide.

3. The vegetable treatment method according to claim 1, wherein
   the cut vegetables include chlorophyll-containing vegetables,
   the bactericidal solution is a sodium hypochlorite aqueous solution with a concentration of 50 to 300 ppm, and
   the cut vegetables are adjusted to a predetermined pH value with the sodium hypochlorite aqueous solution in the step D.

4. The vegetable treatment method according to claim 3, wherein
   the predetermined pH value is 7.0 to 9.5.

5. The vegetable treatment method according to claim 1, comprising
   a step of taking out the cut vegetables from the container basket and packing the cut vegetables without cleaning after the step D is performed.

6. The vegetable treatment method according to claim 5, further comprising
   a step of performing heat treatment at 50 to 90° C. for 1 to 10 minutes after the packing of the cut vegetables is performed.

7. The vegetable treatment method according to claim 1, wherein
   the cut vegetables include chlorophyll-containing vegetables,
   the bactericidal solution is a sodium hypochlorite aqueous solution with a concentration of 50 to 300 ppm, and
   the method further comprises:
      a step E of performing dehydration to remove the sodium hypochlorite aqueous solution after the step D is performed; and
      a step F of applying a sodium hydrogen carbonate solution with a concentration of 0.2 to 0.5% to surfaces of the cut vegetables to adjust the cut vegetables to predetermined pH value after the step E is performed.

8. The vegetable treatment method according to claim 7, wherein
   the predetermined pH value is 7.0 to 9.5.

9. The vegetable treatment method according to claim 7, comprising
   a step of taking out the cut vegetables from the container basket and packing the cut vegetables without cleaning after the step F is performed.

10. The vegetable treatment method according to claim 9, further comprising
- a step of performing heat treatment at 50 to 90° C. for 1 to 10 minutes after the step of the packing of the cut vegetables is performed.

11. The vegetable treatment method according to claim 1, wherein
- the container basket includes a bottomed cylindrical metallic main body portion having a number of through holes and a metallic lid portion having a number of through holes and being arranged so as to close an opening of the main body portion.

12. The vegetable treatment method according to claim 11, wherein
- a diameter of each of the through holes in the main body portion and a diameter of each of the through holes in the lid portion are smaller than a size of each of the cut vegetables.

\* \* \* \* \*